S. B. DINSMORE.
FLAT-IRON HEATER.
No. 189,198.        Patented April 3, 1877.
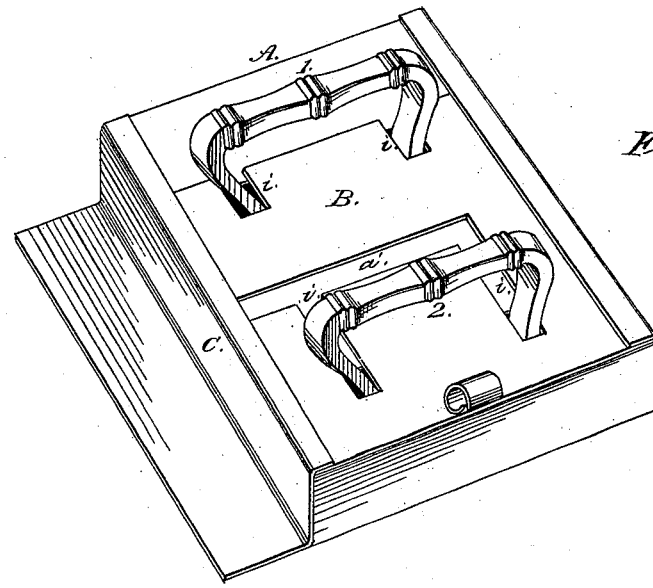
Fig. 1.
Fig. 2.
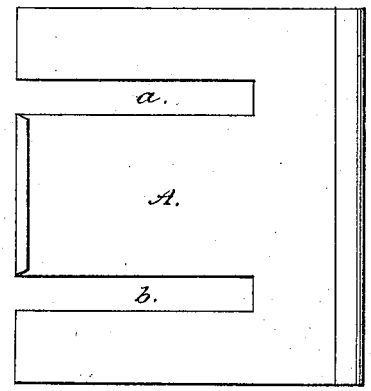
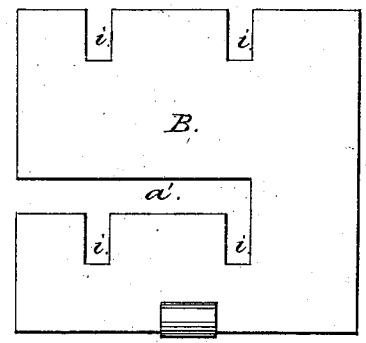
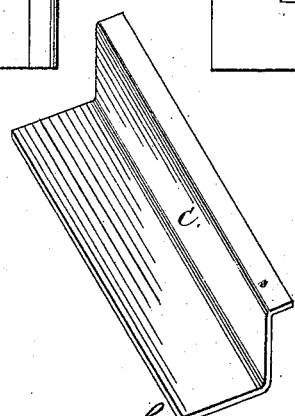
Witnesses:
S. H. Spaulding
F. J. Buker
Inventor:
Samuel B. Dinsmore

UNITED STATES PATENT OFFICE.

SAMUEL B. DINSMORE, OF RICHMOND, MAINE.

IMPROVEMENT IN FLAT-IRON HEATERS.

Specification forming part of Letters Patent No. 189,198, dated April 3, 1877; application filed February 10, 1877.

*To all whom it may concern:*

Be it known that I, SAMUEL B. DINSMORE, of Richmond, in the county of Sagadahoc, in the State of Maine, have invented a Flat-Iron Heater, of which the following is a specification:

The object of my invention is to furnish a cover for the flat-iron while heating that shall retain all the heat around the iron and prevent the handle from becoming hot, while more rapidly heating the iron.

The cover consists of a three-sided pan, inverted, of sufficient depth to admit of the irons, when resting upon the stove or heated surface, and having slots in the top for the passage of the handles of the flat-irons, as shown in the accompanying drawing. A movable slide is placed upon the top of the pan or cover, having corresponding slots, from which lead side or cross slots for the admission of the handles in pushing in the slide and closing all the apertures in the top of the cover. A fourth side of the cover is made entirely detached, and is serviceable in closing the aperture in the side of the cover while the irons are heating. The covers are made with one or more slots for the use of one or more flat-irons, as may be desired.

Figure 1 of the drawing represents the heater containing two flat-irons, 1 and 2, under the cover A, the apertures in the top of which are closed by the slide B, and in the side by the detached side C, all resting upon the stove or heated surface. Fig. 2 represents the parts of the heater more in detail, showing the cover A with slots $a\ b$, the slide B with the slot $a'$, and the side or cross slots $i\ i\ i\ i$, and the detached side C.

I claim as my invention—

The combination of the cover A, slide B, and front C, constructed substantially as described.

SAMUEL B. DINSMORE.

Witnesses:
J. W. SPAULDING,
F. J. BUKER.